US008743332B2

(12) United States Patent
Takano et al.

(10) Patent No.: US 8,743,332 B2
(45) Date of Patent: Jun. 3, 2014

(54) LIQUID CRYSTAL DISPLAY DEVICE (75) Inventors: Keisuke Takano, Saitama-ken (JP);
Arihiro Takeda, Saitama-ken (JP);
Takashi Sasabayashi, Saitama-ken (JP);
Nobuko Fukuoka, Saitama-ken (JP);
Yusuke Morita, Saitama-ken (JP); Jin Hirosawa, Saitama-ken (JP); Hitomi Hasegawa, Saitama-ken (JP); Yoshitaka Yamada, Ishikawa-ken (JP); Keiji Tago, Saitama-ken (JP); Hirokazu Morimoto, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 235 days.

(21) Appl. No.: 13/339,915

(22) Filed: Dec. 29, 2011

(65) Prior Publication Data
US 2012/0182509 A1 Jul. 19, 2012

(30) Foreign Application Priority Data

Jan. 13, 2011 (JP) .................................. 2011-004720

(51) Int. Cl.
*G02F 1/1343* (2006.01)
(52) U.S. Cl.
USPC ........... 349/146; 349/123; 349/141; 349/143; 349/46; 349/139
(58) Field of Classification Search
CPC ................................................ G02F 1/134363
USPC .............. 349/146, 123, 46, 141, 143; 359/54
See application file for complete search history.

(56) References Cited

U.S. PATENT DOCUMENTS

| 6,266,116 B1 | 7/2001 | Ohta et al. | |
| 6,724,452 B1 * | 4/2004 | Takeda et al. | 349/139 |
| 8,405,810 B2 * | 3/2013 | Koh et al. | 349/141 |

(Continued)

FOREIGN PATENT DOCUMENTS

| JP | 6-222397 | 8/1994 |
| JP | 7-92504 A | 4/1995 |

(Continued)

OTHER PUBLICATIONS

U.S. Appl. No. 13/348,906, filed Jan. 12, 2012, Morita, et al.

(Continued)

*Primary Examiner* — Edward Glick
*Assistant Examiner* — Sang V Nguyen
(74) *Attorney, Agent, or Firm* — Oblon, Spivak, McClelland, Maier & Neustadt, L.L.P.

(57) ABSTRACT

In one embodiment, a first substrate includes a pixel electrode having a first main electrode in a belt-like shape extending along a first cross line direction which crosses at an acute angle in a counterclockwise direction with respect to an initial alignment direction of liquid crystal molecules, and a second main electrode in the belt-like shape extending along a second cross line direction which crosses at an acute angle in a clockwise direction with respect to the initial alignment direction of the liquid crystal molecules. A second substrate includes a counter electrode having a pair of third main electrodes in the belt-like shape arranged above a pair of regions sandwiching the first main electrode extending along a first cross line direction and a pair of fourth main electrodes in the belt-like shape arranged above a pair of regions sandwiching the second main electrode extending along the second cross line direction.

11 Claims, 6 Drawing Sheets

(56) References Cited

U.S. PATENT DOCUMENTS

| | | |
|---|---|---|
| 2001/0010575 A1 | 8/2001 | Yoshida et al. |
| 2004/0165136 A1 | 8/2004 | Sugiyama et al. |
| 2005/0206824 A1 | 9/2005 | Son et al. |
| 2005/0219453 A1* | 10/2005 | Kubo et al. ............ 349/143 |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1* | 8/2008 | Kwon et al. ............ 349/139 |
| 2008/0303998 A1* | 12/2008 | Ohta et al. ............ 349/143 |
| 2009/0091678 A1* | 4/2009 | Jeong et al. ............ 349/46 |
| 2009/0103035 A1* | 4/2009 | Suzuki et al. ............ 349/141 |
| 2009/0207363 A1 | 8/2009 | Hirosawa |
| 2009/0231531 A1* | 9/2009 | Yoo et al. ............ 349/143 |
| 2009/0251654 A1* | 10/2009 | Itou et al. ............ 349/141 |
| 2009/0279014 A1* | 11/2009 | Okamoto et al. ............ 349/55 |
| 2009/0284704 A1* | 11/2009 | Suzuki ............ 349/144 |
| 2009/0310076 A1* | 12/2009 | Hsieh et al. ............ 349/144 |
| 2010/0014039 A1* | 1/2010 | Kim et al. ............ 349/139 |
| 2010/0060814 A1* | 3/2010 | Harada et al. ............ 349/39 |
| 2010/0060838 A1* | 3/2010 | Kim et al. ............ 349/141 |
| 2010/0245222 A1* | 9/2010 | Cho et al. ............ 345/89 |
| 2011/0075082 A1* | 3/2011 | Katayama et al. ............ 349/123 |
| 2011/0157504 A1* | 6/2011 | Kimura et al. ............ 349/38 |
| 2011/0234947 A1 | 9/2011 | Hirosawa |

FOREIGN PATENT DOCUMENTS

| | | |
|---|---|---|
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2008-46599 A | 2/2008 |
| JP | 2008-191664 A | 8/2008 |

OTHER PUBLICATIONS

U.S. Appl. No. 13/350,337, filed Jan. 13, 2012, Fukuoka, et al.
U.S. Appl. No. 13/369,057, filed Feb. 8, 2012, Hirosawa.
U.S. Appl. No. 13/405,799, filed Feb. 27, 2012, Hirosawa, et al.
U.S. Appl. No. 13/546,655, filed Jul. 11, 2012, Takano, et al.
U.S. Appl. No. 13/542,049, filed Jul. 5, 2012, Takeda, et al.
U.S. Appl. No. 13/562,647, filed Jul. 31, 2012, Takeda, et al.
U.S. Appl. No. 13/469,458, filed May 11, 2012, Takeda, et al.
U.S. Appl. No. 13/470,578, filed May 14, 2012, Takeda, et al.
U.S. Appl. No. 13/414,079, filed Mar. 7, 2012, Tago, et al.
U.S. Appl. No. 13/425,779, filed Mar. 21, 2012, Takano, et al.
Japanese Office Action issued Oct. 1, 2013 in Patent Application No. 2011-004720 (English Translation only).

* cited by examiner

LIQUID CRYSTAL DISPLAY DEVICE

CROSS-REFERENCE TO RELATED APPLICATION

This application is based upon and claims the benefit of priority from prior Japanese Patent Application No. 2011-004720, filed Jan. 13, 2011, the entire contents of which are incorporated herein by reference.

FIELD

Embodiments described herein relate generally to a liquid crystal display device.

BACKGROUND

In recent years, a flat panel display is developed briskly, and especially the liquid crystal display device gets a lot of attention from advantages, such as light weight, thin shape, and low power consumption. Especially, in an active matrix type liquid crystal display device provided with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a counter electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the counter electrode formed in a counter substrate.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding parts throughout the several views.

According to one embodiment, a liquid crystal display device includes: a first substrate including; gate lines, source lines, a pixel electrode having a first main electrode in a belt-like shape extending along a first cross line direction which crosses at an acute angle in a counterclockwise direction with respect to an initial alignment direction of liquid crystal molecules, and a second main electrode in the belt-like shape extending along a second cross line direction which crosses at an acute angle in a clockwise direction with respect to the initial alignment direction of the liquid crystal molecules, and a first alignment film covering the pixel electrode, a second substrate including; a counter electrode having a pair of third main electrodes in the belt-like shape arranged above a pair of regions sandwiching the first main electrode extending along the first cross line direction and a pair of fourth main electrodes in the belt-like shape arranged above a pair of regions sandwiching the second main electrode extending along the second cross line direction, a second alignment film, and a liquid crystal layer held between the first substrate and the second substrate.

Figure 1:
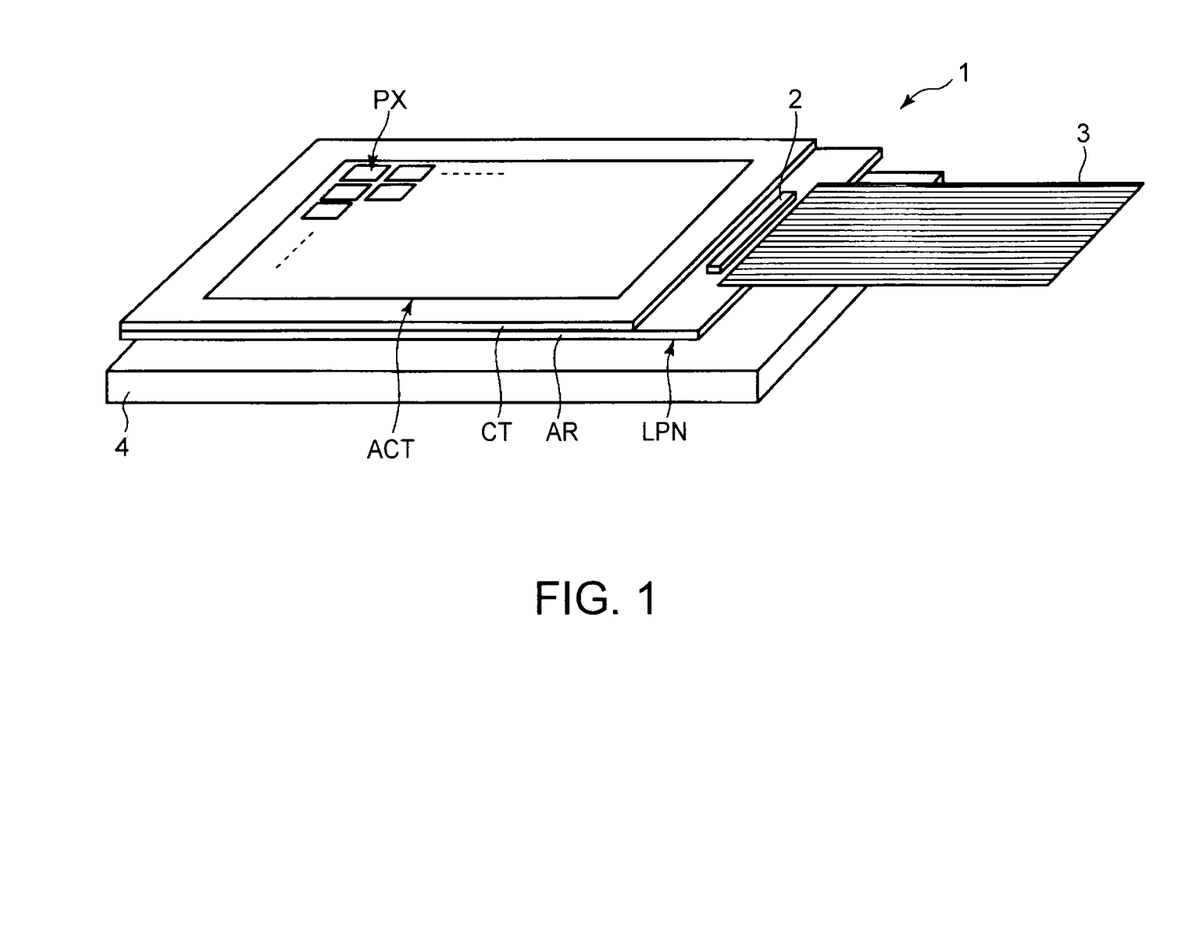
FIG. 1 is a figure schematically showing a structure of a liquid crystal display device in this embodiment.

FIG. 1 is a figure schematically showing the structure of the liquid crystal display device according to one embodiment.

The liquid crystal display device 1 includes an active-matrix type liquid crystal display panel LPN, a driver IC chip 2 connected to the liquid crystal display panel LPN, a flexible wiring substrate 3, a back light 4 for illuminating the liquid crystal display panel LPN, etc.

The liquid crystal display panel LPN is equipped with an array substrate AR as a first substrate, a counter substrates CT as a second substrate arranged opposing the array substrate AR, and a liquid crystal layer (not shown) held between the array substrate AR and the counter substrates CT. The liquid crystal display panel LPN includes an active area ACT which displays images. The active area ACT is constituted by a plurality of pixels PX arranged in the shape of a (m×n) matrix (here, "m" and "n" are positive integers).

A back light 4 is arranged on the back side of the array substrate AR in the illustrated example. Various types of backlights can be used as the backlight 4. For example, a light emitting diode (LED) or a cold cathode fluorescent lamp (CCFL), etc., can be applied as a light source of the back light, and the explanation about its detailed structure is omitted.

Figure 2:
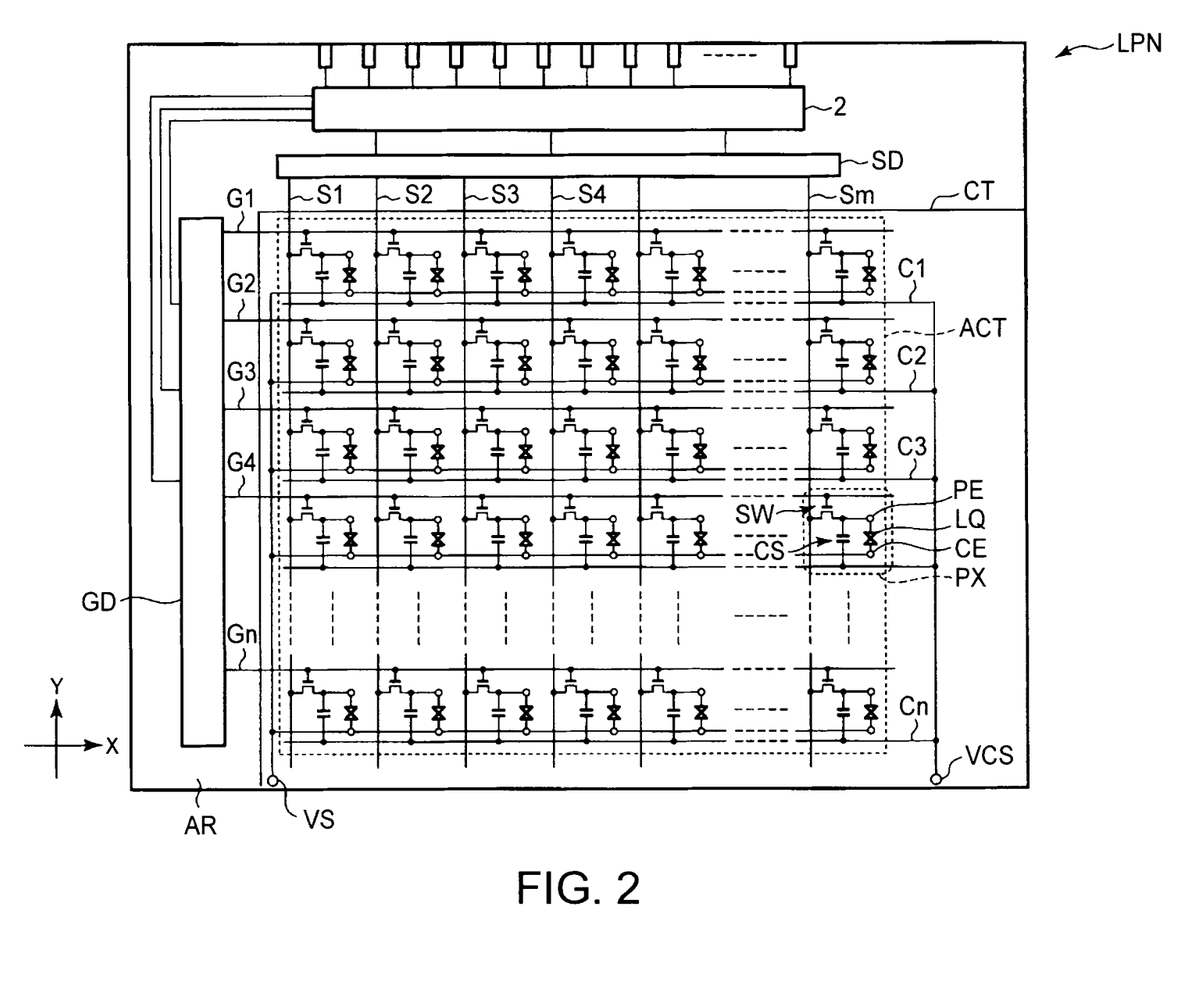
FIG. 2 is a figure schematically showing the structure and the equivalent circuit of a liquid crystal display panel shown in FIG. 1.

FIG. 2 is a figure schematically showing a structure and an equivalent circuit of the liquid crystal display panel LPN shown in FIG. 1.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C respectively extend in a first direction X. Moreover, the gate line G and the auxiliary capacitance line C are arranged in parallel each other in a second direction Y that intersects perpendicularly the first direction X in turns. The source lines S extend in the second direction Y that intersects the gate line G and the auxiliary capacitance line C in parallel. That is, the gate line G and the auxiliary capacitance line C orthogonally cross the source lines S.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having a controller.

Each pixel PX includes a switching element SW, a pixel electrode PE, a counter electrode CE, etc. Retention capacitance Cs is formed, for example, between the auxiliary capacitance line C and the pixel electrode PE.

In addition, in the liquid crystal display panel LPN according to this embodiment, while the pixel electrode PE is formed in the array substrate AR, the counter electrode CE is formed in the counter substrate CT. The liquid crystal molecule of a liquid crystal layer LQ is switched mainly using an electric field formed between the pixel electrodes PE and the counter electrodes CE. The electric field formed between the pixel electrode PE and the counter electrode CE is a lateral electric field substantially in parallel with the principal surface of the array substrate AR or the principal surface of the counter substrate CT, or an oblique electric field slightly oblique with respect to the principle surface of the substrates.

The switching element SW is constituted by n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The counter electrode CE is set to a common potential, for example. The counter electrode CE is arranged in common to the plurality of pixel electrodes PE through the liquid crystal layer LQ. The counter electrode CE is electrically connected with an electric power supply portion VS formed in the array substrate AR through an electric conductive component which is not illustrated. The auxiliary capacitance line C is electrically connected with a voltage impressing portion VCS to which the auxiliary capacitance voltage is impressed.

Figure 3:
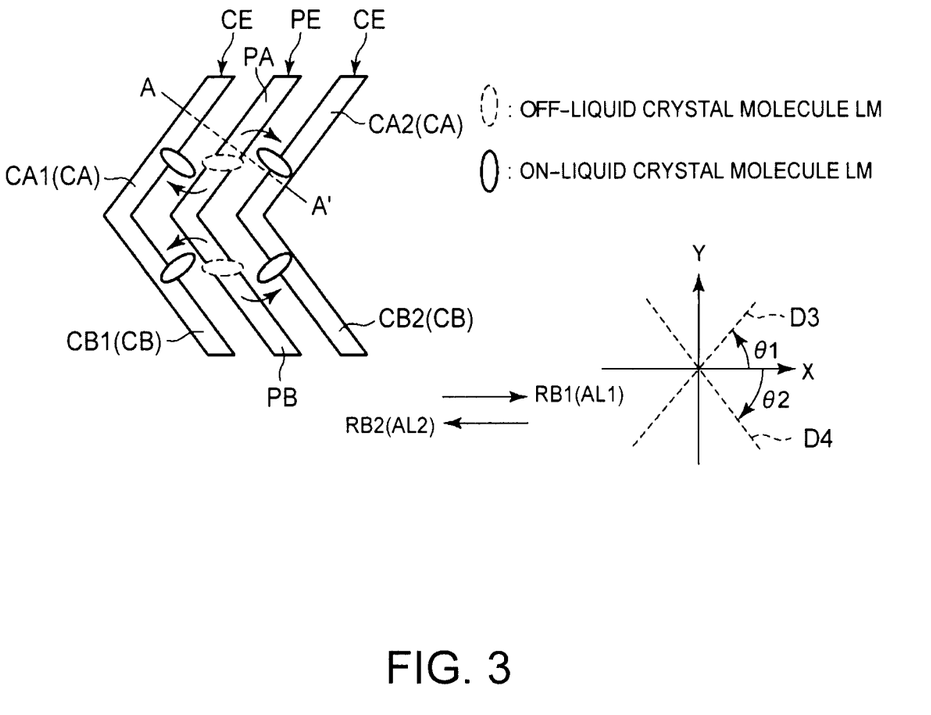
FIG. 3 is a plan view schematically showing a minimum unit configuration of one pixel.

FIG. 3 is a plan view schematically showing a minimum unit configuration of one pixel PX.

The pixel electrode PE includes a first main electrode PA and a second main electrode PB. The first main electrode PA and the second main electrode PB extend in different directions from the first direction X in which the gate line extends, the second direction Y in which the source line extends, and further the direction of initial alignment of liquid crystal molecules to be mentioned later.

Hereinafter, the structure is explained more practically. Here, the case is explained, in which the direction of the initial alignment corresponds to the first direction X, the direction of a first cross line which intersects the direction of the initial alignment with an acute angle in the counterclockwise direction corresponds to a third direction D3, and the direction of a second cross line which intersects the direction of the initial alignment with an acute angle in the clockwise direction corresponds to a fourth direction D4.

The first main electrode PA extends along the first cross line direction, i.e., the third direction D3 in a belt-like shape. The second main electrode PB extends along the second cross line direction, i.e., the fourth direction D4, in a belt-like shape. The first main electrode PA and the second main electrode PB are connected at its end, respectively. Therefore, the pixel electrode PE is formed approximately in a V character shape.

The counter electrode CE contains a third main electrode CA and a fourth main electrode CB which extend in different directions from the first direction X and the second direction Y. The third main electrode CA extends along the first cross line direction, i.e., the third direction D3 in a belt shape. The fourth main electrode CB extends along the second cross line direction, i.e., the fourth direction D4, in a belt-like shape. The third main electrode CA and the fourth main electrode CB are connected at its end, respectively. For this reason, the counter electrode CE has the same shape as the pixel electrode PE, i.e., a V character shape.

In addition, two third main electrodes CA as illustrated are located in a line along the first direction X. Hereinafter, in order to distinguish the two third main electrodes CA, the third main electrode of the left-hand side in the figure is called CA1, and the third main electrode of the right-hand side in the figure is called CA2. Similarly, two fourth main electrodes CB are also located in a line along the first direction X. Hereinafter, in order to distinguish the two fourth main electrodes CB, the fourth main electrode of the left-hand side in the figure is called CB1, and the fourth main electrode of the right-hand side in the figure is called CB2. The third main electrode CA1 and the fourth main electrode CB1 are connected, and the third main electrode CA2 and the fourth main electrode CB2 are connected, respectively. The third main electrodes CA1 and CA2 and the fourth main electrodes CB1 and CB2 are electrically connected altogether. That is, the counter electrode CE is formed in a comb-like shape.

A first main electrode PA is located between adjoining main electrodes CA1 and CA2. That is, the third main electrodes CA1 and CA2 are arranged on both sides of the first main electrode PA. For this reason, the third main electrode CA1, the first main electrode PA and third main electrode CA2 are arranged along the first direction X alternately. The first main electrode PA and the third main electrodes CA1 and CA2 are arranged in parallel each other. Moreover, the distance between the third main electrode CA1 and the first main electrode PA is almost the same as that between the third main electrode CA2 and the first main electrode PA.

A second main electrode PB is located between the adjoining fourth main electrodes CB1 and CB2. That is, the fourth main electrodes CB1 and CB2 are arranged on both sides of the second main electrode PB. For this reason, the fourth main electrode CB1, the second main electrode PB and the fourth main electrode CB2 are arranged along the first direction X alternately. The second main electrode PB and the fourth main electrodes CB1 and CB2 are arranged in parallel each other. Moreover, the distance between the fourth main electrode CB1 and the second main electrode PB is almost the same as that of the distance between the fourth main electrode CB2 and the second main electrode PB.

Here, the angle $\theta 1$ between the direction of initial alignment and the direction of a first cross line, i.e., the angle between the first direction X and the third direction D3 is preferably set to be smaller than 45° and larger than 0°, and similarly the angle $\theta 2$ between the direction of initial alignment and the direction of the second cross line, i.e., the angle between the first direction X and the fourth direction D4 is preferably set to be an angle smaller than 45° and larger than 0°. Moreover, the angle $\theta 1$ may be the same as the angle $\theta 2$. In this case, when the length of the first main electrode PA is the same as that of the second main electrode PB, the pixel electrode PE becomes line symmetry with respect to a boundary line between the first main electrode PA and the second main electrode PB extending in the first direction X. Moreover, in this case, when the length of the third main electrode CA2 is the same as that of the fourth main electrode CB2, the counter electrode CE becomes line symmetry with respect to the boundary line between the third main electrode CA and the fourth main electrode CB extending in the first direction X.

Figure 4:
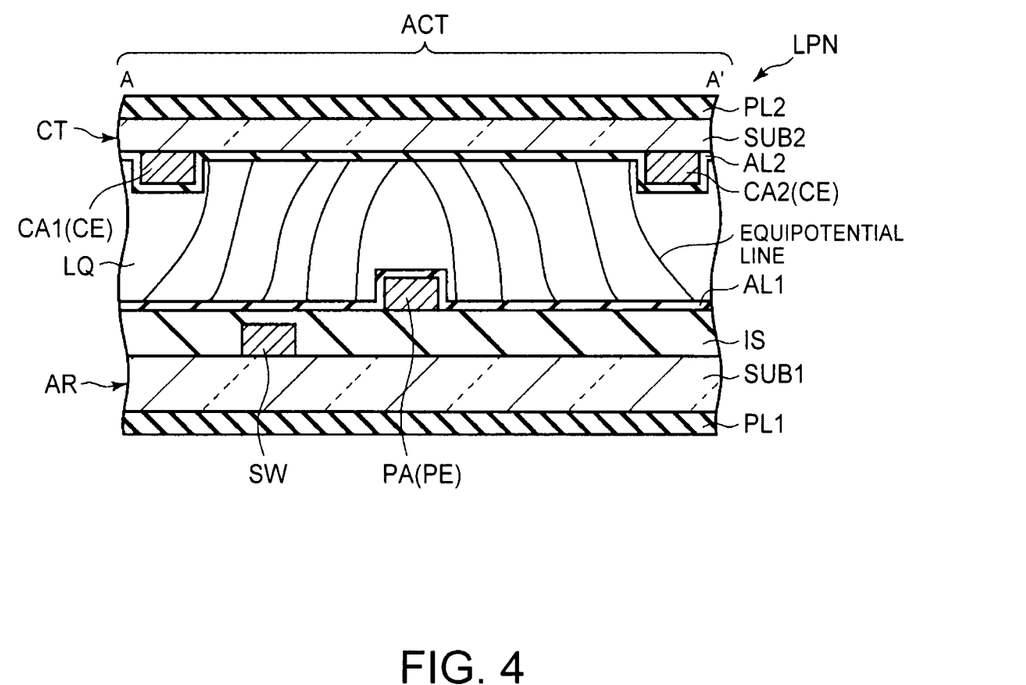
FIG. 4 is a cross-sectional view schematically showing the liquid crystal display panel including a first main electrode, a third main electrode, a switching element in the minimum unit configuration of one pixel shown in FIG. 3.

FIG. 4 is a cross-sectional view schematically showing the first main electrode PA, the third main electrodes CA1 and CA2, and the liquid crystal display panel LPN containing the switching element SW among the unit configurations shown in FIG. 3. Here, an isoelectric line is formed in the state where potential difference is formed between the first main electrode PA and the third main electrodes CA1 and CA2.

The array substrate AR is formed using a first insulating substrate SUB1 with light transmissivity, such as a glass substrate and a plastic substrate. The array substrate AR is equipped with the switching element SW, a pixel electrode PE, and a first alignment film AL1, etc., on the side which faces the counter substrate CT of the first insulating substrate SUB1.

The switching element SW may be a top gated type or a bottom gated type. Although not explained in detail, the switching element SW is equipped with a semiconductor layer formed of poly-silicon or amorphous silicon. The switching element SW is covered with an insulating layer IS in the illustrated example.

The pixel electrode PE contains the illustrated first main electrode PA and the non-illustrated second main electrode PB. The pixel electrode PE is formed of electric conductive and transmissive material, such as Indium Tin Oxide (ITO) and Indium Zinc Oxide (IZO). In the illustrated example, the pixel electrode PE is formed on the insulating layer IS, and is electrically connected with the switching element SW through a contact hole formed in the insulating layer IS.

The first alignment film AL1 is arranged on the array substrate AR facing the counter substrate CT, and covers approximately whole active area ACT. The first alignment film AL1 covers the pixel electrode PE. The first alignment film AL1 is formed of the material which shows a lateral alignment characteristics. Rubbing processing is carried out to the first alignment film AL1 in a first rubbing direction RB1.

On the other hand, the counter substrate CT is formed using a second insulating substrate SUB2 with transmissivity, such as a glass substrate and a plastic substrate. The counter substrate CT is equipped with a counter electrode ET and a second alignment film AL2. In addition, the counter substrate CT may be equipped with a black matrix which divides the pixels into each pixel PX, a color filter layer arranged corresponding to each pixel, and an overcoat layer to smooth concavo-convex of the surface of the color filter layer, etc., although the illustration is omitted.

The counter electrode CE includes third main electrodes CA1 and CA2 as illustrated, and fourth electrodes CB1 and CB2 that are not illustrated. The counter electrode CE is formed of electric conductive material with transmissivity, such as ITO and IZO. As illustrated, the third main electrodes CA1 and CA2 are arranged in positions shifted from right above the first main electrode PA. That is, each of the third main electrodes CA1 and CA2 is arranged on the both sides of the position right above the first main electrode PA, and are arranged so that they may not counter the first main electrode PA. Similarly, although not illustrated, each of the fourth main electrodes CB1 and CB2 is arranged on the both sides sandwiching a right above position of the second main electrode PB, and are arranged so that they may not counter the second main electrode PB.

The second alignment film AL2 is arranged on the array substrate AR facing the counter substrate CT, and covers approximately whole of the active area ACT. The second alignment film AL2 covers the pixel electrode PE. The second alignment film AL2 is formed of material which shows a lateral alignment characteristics. Rubbing processing is carried out to the second alignment film AL2 in a second rubbing direction RB2.

The direction RB1 of the first rubbing direction RB1 of the alignment film AL1 and the second rubbing direction RB2 of the second alignment film AL2 are set in parallel with the directions of initial alignment respectively, and also parallel with the first direction X in the illustrated example. In the example shown in FIG. 3, the first and second rubbing directions RB1 and RB2 are arranged in parallel and in reverse directions each other.

The array substrate AR and the counter substrate CT as described-above are arranged so that respective first and second alignment films AL1 and AL2 face each other. At this time, a pillar-shaped spacer formed integrally in one of the substrates is arranged by resin material between the first alignment film AL1 of array substrate AR and second alignment film AL2 of the counter substrate CT, and thereby, a predetermined gap, for example, 3-7 µm cell gap, is formed. The array substrate AR and the counter substrate CT are attached together by a seal material which is not illustrated, in which a predetermined cell gap is formed.

The liquid crystal layer LQ is held in the cell gap formed between the array substrate AR and the counter substrate CT, and is arranged between the first alignment film AL1 and the second alignment film AL2. Although the liquid crystal layer LQ is not illustrated, the liquid crystal layer LQ contains the liquid crystal molecule. The liquid crystal layer LQ is constituted of positive type liquid crystal material.

A first polarizing plate PL1 with a first polarization axis is attached on the external surface of the array substrate AR, i.e., the external surface of the first insulating substrate SUB1 which constitutes the array substrate AR by adhesives, etc. Moreover, a second polarizing plate PL2 with a second polarization axis is attached on the external surface of the counter substrate CT, i.e., the external surface of the second insulating substrate SUB2 which constitutes the counter substrate CT by adhesives, etc.

The first polarization axis of the first polarizing plate PL1 and the second polarization axis of the second polarizing plate PL2 are arranged so as to intersect perpendicularly each other. One polarizing plate is arranged so that the polarization axis is arranged in parallel with the direction of long axis of the liquid crystal molecule, i.e., in parallel with the first rubbing direction RB1 and the second rubbing direction RB2 or in orthogonal, that is, parallel with the second direction Y. Thereby, a normally black mode is realized.

Namely, in case voltage is not impressed to the liquid crystal layer LQ, (at the time of OFF), that is, a voltage difference is not formed between the pixel electrode PE and the counter electrode CE, the liquid crystal molecule LM of the liquid crystal layer LQ is aligned in the direction parallel with the first rubbing direction RB1 and the second rubbing direction RB2. The alignment direction of the liquid crystal molecule LM at the time of such OFF time corresponds to the initial alignment direction. Here, both first and second rubbing directions RB1 and RB2 are parallel to the first direction X, and are the reverse direction each other.

For this reason, as shown in a dashed line in FIG. 3, the liquid crystal molecule LM is aligned so that that long axis may become parallel with the first direction X. That is, the direction of the initial alignment of the liquid crystal molecule LM turns into the first direction X, and in this time, the liquid crystal molecule LM is aligned with an approximately uniform pre-tilt angle at adjacent areas to the first alignment film AL1, the second alignment film AL2, and an intermediate area of the liquid crystal layer LQ (homogeneous alignment).

In addition, when both first and second rubbing directions RB1 and RB2 are parallel with the first direction X, and are reverse directions each other, the liquid crystal molecule LM is aligned so that the long axis may become parallel with the first direction X. At this time, in the intermediate area of the liquid crystal layer LQ, the liquid crystal molecule LM is aligned approximately aligned with parallel direction (i.e., the pre tilt angle is approximately zero). The liquid crystal molecule LM is aligned with the pre-tilt angle so that the alignment of the liquid crystal molecule LM near the first alignment film AL1 and the second alignment film AL2 becomes symmetrical with respect to the intermediate area (for splay alignment).

Some of the back light from the back light 4 enters into the liquid crystal display panel LPN after penetrating the first polarizing plate PL1. The polarization state of the light which enters into the liquid crystal display panel LPN changes depending on the alignment state of the liquid crystal molecule when the light passes the liquid crystal layer LQ. At the time of OFF, the light which passes the liquid crystal layer LQ is absorbed by the second polarizing plate PL2 (black display).

On the other hand, in case where the potential difference is formed between the pixel electrode PE and the counter electrode CE (at the time of ON), the parallel lateral electric field to the substrate is formed between the first main electrode PA and third main electrode CA1, and between the first main electrode PA and third main electrode CA2, respectively. Similarly, although not illustrated, the parallel lateral electric field with the substrate is formed between the second main electrode PB and the fourth main electrode CB1, and between the second main electrode PB and the fourth main electrode CB2, respectively as shown in FIG. 4. Thereby, the liquid crystal molecule LM rotates within a parallel plane with the substrate surface so that the long axis becomes in parallel with the direction of the electric field.

In the example shown in FIG. 3, the liquid crystal molecule LM between the first main electrode PA and the third main electrode CA1 rotates clockwise along with the lateral electric field between the first main electrode PA and the third main electrode CA1, and is aligned so that the liquid crystal molecule LM may turn to the upper left direction with respect to the first direction X in the figure. The liquid crystal molecule LM between the first main electrode PA and the third main electrode CA2 rotates clockwise along with the lateral electric field between the first main electrode PA and the third main electrode CA2, and is aligned so that the liquid crystal molecule LM may turn to the lower right direction with respect to the first direction X in the figure.

Moreover, the liquid crystal molecule LM between the second main electrode PB and the fourth main electrode CB1 rotates counterclockwise along with the lateral electric field between the second main electrode PB and the fourth main electrode CB1, and is aligned so that the liquid crystal molecule LM may turn to the lower left direction with respect to the first direction X in the figure. The liquid crystal molecule LM between the second main electrode PB and the fourth main electrode CB2 rotates counterclockwise along with the lateral electric field between the second main electrode PB and the fourth main electrode CB2, and is aligned so that the liquid crystal molecule LM may turn to the upper right direction with respect to the first direction X.

Thus, in each pixel PX, where horizontal electric field is formed between the pixel electrode PE and the counter electrode CE, the direction of alignment of the liquid crystal molecule LM is divided into four directions, and respective domains are formed in each direction of the alignment. That is, four domains are formed in each pixel PX.

The polarization state changes when a part of the back light which enters into the liquid crystal display panel LPN between the first main electrode PA and the third main electrode CA1, between the first main electrode PA and the third main electrode CA2, between the second main electrode PB and the fourth main electrode CB1, and between the second main electrode PB and the fourth main electrode CB2. At the time of ON state, the light which passes the liquid crystal layer LQ penetrates the second polarizing plate PL2 (white display).

That is, each of the regions between the first main electrode PA and third main electrode CA1, between the first main electrode PA and third main electrode CA2, between the second main electrode PB and the fourth main electrode CB1, and between the second main electrode PB and the fourth main electrode CB2 forms an opening (or transmitting portion), respectively, which contributes to the display.

According to above structure, it becomes possible to form four domains. Therefore, the viewing angle in four directions can be compensated optically, and a wide viewing angle is attained while becoming possible to suppress the generation of gradation reversal. Accordingly, it becomes possible to offer a high quality display device.

In case the liquid crystal molecule LM is aligned in the first direction X, when the liquid crystal molecule LM is off, that is, the first rubbing direction RB1, and second rubbing direction RB2 are parallel with the first direction X, the angle $\theta 1$ between the first direction X and the third direction D3 in which the first main electrode PA of the pixel electrode PE and the third main electrode CA of the counter electrode CE extend, and the angle $\theta 2$ between the first direction X and the fourth direction D4 in which the second main electrode PB of the pixel electrode PE and the fourth main electrode CB of the counter electrode CE extend, and are preferably larger than 0° and smaller than 45°, respectively.

When electric field is formed between the pixel electrode PE and the counter electrode CE, in which the angle $\theta 1$ and the angle $\theta 2$ become not less than 45°, it becomes difficult to rotate the liquid crystal molecule LM in each domain uniformly in the above-mentioned direction, and becomes easy to produce alignment disorder. On the other hand, when the angle $\theta 1$ and the angle $\theta 2$ are acute angles smaller than 45° respectively, even if the intensity of electric field between the pixel electrode PE and the counter electrode CE is comparatively small, the liquid crystal molecule LM rotates uniformly in the above-mentioned direction in each domain, and it becomes possible to form four domains stably.

In addition, it is very effective to set the angle between the extending direction of the pixel electrode and the counter electrode and the rubbing direction to 5-about 25°, and more preferably about 10° in the viewpoint of the control for the alignment of the liquid crystal molecule.

Moreover, when the angle $\theta 1$ is the same as the angle $\theta 2$, the alignment direction of the liquid crystal molecule LM between the first main electrode PA and the third main electrode CA becomes line symmetry with respect to the alignment direction of the liquid crystal molecule LM between the second main electrode PB and the fourth main electrode CB at the time of ON state.

Moreover, in one pixel in which the pixel electrode PE is arranged, the area of the opening formed between the first main electrode PA and the third main electrode CA, is approximately the same as the area of the opening formed between the second main electrode PB and the fourth main electrode CB, preferably. In this case, further, the area of the opening formed between the first main electrode PA and third main electrode CA1 is approximately the same as the area of the opening formed between the first main electrode PA and the third main electrode CA2. Further, it is more preferable for the area of the opening formed between the second main electrode PB and the fourth main electrode CB1 to be the same as the area of the opening formed between the second main electrode PB and the fourth main electrode CB2.

Thereby, the transmissivity of each domain becomes approximately same. For this reason, the light penetrating each opening compensates each other optically, and it becomes possible to achieve the wide viewing angle range and to realize a uniform display.

In addition, the horizontal electric field is hardly formed (or sufficient electric field to drive the liquid crystal molecule LM is not formed) in the regions near the first main electrode PA and the second main electrode PB of the pixel electrode PE, and the third main electrode CA and the fourth main electrode CB of the counter electrode CE, at the time of ON state. Accordingly, the liquid crystal molecule LM hardly moves from the first direction X like the time of OFF state. For this reason, although the pixel electrode PE and the counter electrode CE are formed of the electric conductive material with transmissivity, the back light hardly penetrates the electrodes in the domains, and they hardly contributes to the display at the time of ON state. Therefore, the pixel electrode PE and the counter electrode CE do not necessarily need to be formed of a transparent electric conductive material, and may be formed using electric conductive materials, such as aluminum and silver.

Moreover, when an alignment shift occurs between the array substrate AR and the counter substrate CT, a difference may arise in distance between the respective counter electrodes CE of the both sides and the pixel electrode PE. However, the alignment shift is produced common to all the pixels PX, there is no difference in the electric field distribution between the pixels PX, and the display of the image is not affected.

Next, the structure according to this embodiment is explained. This embodiment corresponds to the case in which the pixel PX is formed of a plurality of unit configuration. The unit configuration is formed by combining the first main electrode PA and the third main electrode CA which extend along the third direction D3, and combining the second main electrode PB and the fourth main electrode CB which extend along the fourth direction D4 as above-mentioned.

In this embodiment, one pixel includes a first unit structure UA1 and a second unit structure UA2 arranged in one direction, particularly, in the second direction Y. However, the arrangement direction may be one direction other than the second direction Y, for example, the first direction X.

Figure 5:
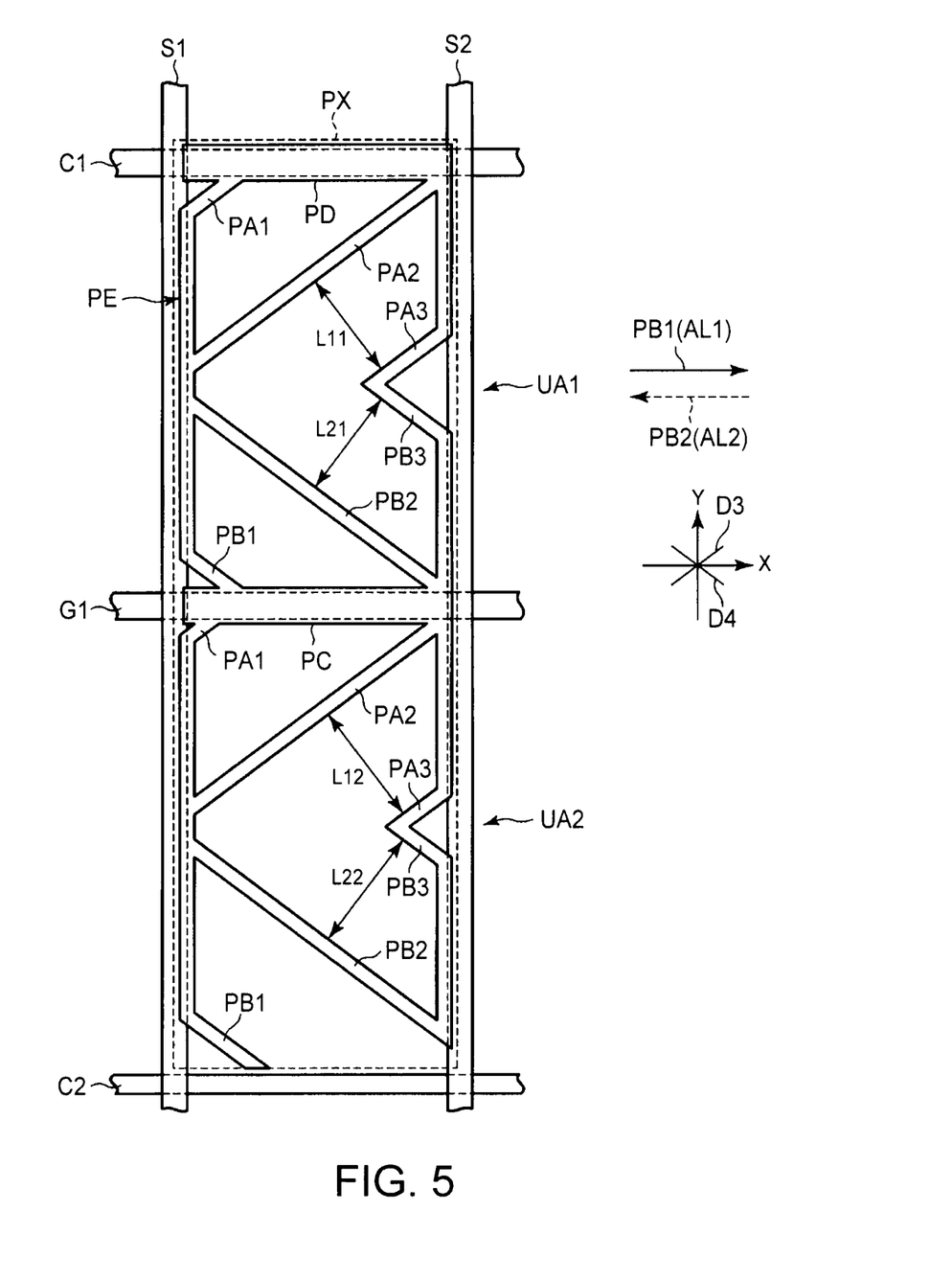
FIG. 5 is a plan view schematically showing a structure of an array substrate when the pixel of the liquid crystal display panel is looked from a counter substrate side according to this embodiment.

FIG. 5 is a plan view schematically showing the structure of the array substrate AR in which the pixel PX of the liquid crystal display panel LPN is looked from the counter substrate CT side in this embodiment.

Although detailed explanation is omitted, the pixel electrode PE includes the first main electrodes PA1 to PA3 and the second main electrodes PB1 to PB3 forming the first unit configuration UA1 in the upper half of the pixel PX. Similarly, the pixel electrode PE includes the first main electrodes PA1 to PA3 and the second main electrodes PB1 to PB3 forming the second unit configuration UA2 in the lower half of the pixel PX.

In the first unit configuration UA1, the first main electrodes PA1 to PA3 linearly extend along the third direction D3, respectively, and arranged with a fixed distance (L11). The second main electrodes PB1 to PB3 linearly extend along the fourth direction D4, respectively, and arranged with a fixed distance (L21).

In the second unit configuration UA2, the first main electrodes PA1 to PA3 linearly extend along the third direction D3, respectively with approximately the same distance (L12). In addition, each distance L12 between the adjacent first main electrodes PA1 to PA3 in the second unit configuration UA2 differs from each distance L11 between the adjacent first main electrodes PA1 to PA3 in the first unit configuration UA1. Here, the distance L12 is larger than the distance L11.

Moreover, in the second unit configuration UA2, the second main electrodes PB1 to PB3 linearly extend along the fourth direction D4 with approximately same distance (L22) among them. In addition, each distance L22 between the adjacent second main electrodes PB1 to PB3 in the second unit configuration UA2 differs from each distance L21 between the adjacent second main electrodes PB1 to PB3 in the first unit configuration UA1. Here, the distance L22 is larger than the distance L21.

Moreover, the pixel electrode PE includes a first secondary electrode PC between the first unit configuration UA1 and the second unit configuration UA2, and a capacitance portion PD arranged at one end side of the pixel. The first secondary electrode PC is arranged above the gate line G which crosses approximately the center of the pixel PX. The capacitance portion PD is arranged above the auxiliary capacitance line C1.

The first main electrodes PA1 to PA3 and the second main electrodes PB1 to PB3 constituting the first unit configuration UA1, the first main electrodes PA1 to PA3 and the second main electrodes PB1 to PB3 constituting the second unit configuration UA2, the first secondary electrode PC and the capacitance portion PD are electrically connected each other.

Figure 6:
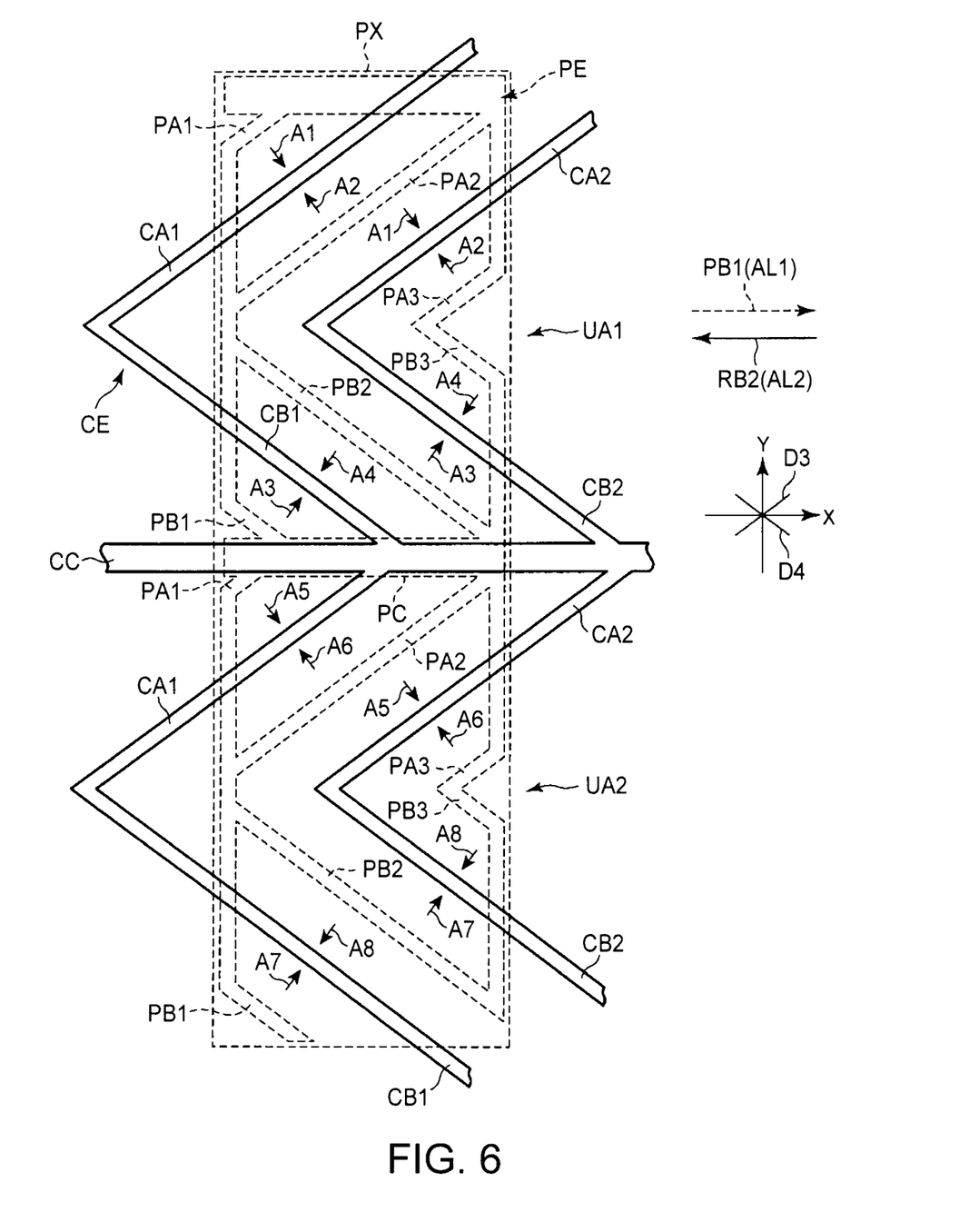
FIG. 6 is a plan view schematically showing a structure of the pixel in the counter substrate of the liquid crystal display panel according to this embodiment.

FIG. 6 is a plan view schematically showing the structure of the pixel PX in the counter substrate CT of the liquid crystal display panel LPN in this embodiment. In addition, in order to explain the relationship between the counter electrode CE and the pixel electrode PE, the pixel electrode PE is illustrated with dashed lines.

The counter electrode CE includes third main electrodes CA1 and CA2 and fourth main electrodes CB1 and CB2 forming the first unit configuration UA1 in the upper half of the pixel PX. Similarly, the pixel electrode PE includes third main electrodes CA1 and CA2 and fourth main electrodes CB1 and CB2 forming the second unit configuration UA2 in the lower half of the pixel PX.

In the first unit configuration UA1, each of the third main electrode CA1 and CA2 linearly extends along the third direction D3, and each of the fourth main electrode CB1 and CB2 linearly extends along the fourth direction D4. Similarly, in the second unit configuration UA2, each of the third main electrode CA1 and CA2 linearly extends along the third direction D3, and each of the fourth main electrodes CB1 and CB2 linearly extends along the fourth direction D4.

In the respective first unit configuration UA1 and the second unit configuration UA2, the third main electrodes CA1 and CA2 are arranged without overlapping with the first main electrodes PA1 to PA3 with a fixed distance therebetween. That is, the third main electrode CA1 is arranged approximately in the middle portion between the first main electrode PA1 and the first main electrode PA2. The third main electrode CA2 is arranged approximately in the middle portion between the first main electrode PA2 and the first main electrode PA3. Similarly, the fourth main electrodes CB1 and CB2 are arranged without overlapping with the second main electrodes PB1 to PB3 with a fixed distance. Namely, the fourth main electrode CB1 is arranged approximately in the middle portion between the second main electrode PB1 and the second main electrode PB2. The fourth main electrode CB2 is arranged approximately in the middle portion between the second main electrode PB2 and the second main electrode PB3.

Moreover, the counter electrode CE includes a second secondary electrode CC arranged between the first unit configuration UA1 and the second unit configuration UA2. The second secondary electrode CC is arranged above the gate line G which crosses approximately the center portion of the pixel PX.

In this embodiment, the distance between the first main electrode PA and the third main electrode CA in the first unit configuration UA1 differs from the distance between the first main electrode PA and the third main electrode CA in the second unit configuration UA2. Moreover, the distance between the second main electrode PB and the fourth main electrode CB in the first unit configuration UA1 differs from the distance between the second main electrode PB and the fourth main electrode CB in the second unit configuration UA2.

In the upper half of the pixel PX, respective openings are formed between the first main electrode PA1 of the pixel electrode PE and the third main electrodes CA1 of the counter electrode CE, between third main electrodes CA1 and the first main electrode PA2, between the first main electrode PA2 and the third main electrode CA2, and between the third main electrode CA2 and the first main electrode PA3 in the first unit configuration UA1. Further, respective openings are formed between the first main electrode PB1 of the pixel electrode PE and the third main electrodes CB1 of the counter electrode CE, between the third main electrodes CB1 and the first main electrode PB2, between the first main electrode PB2 and the third main electrode CB2, and between the third main electrode CB2 and the first main electrode PB3 in the first unit configuration UA1. Where electric field is formed between the pixel electrode PE and the counter electrode CE in the first unit configuration UA1, the main alignment direction of the liquid crystal molecule LM in each opening is the direction shown in one of the arrows A1 to A4 in the figure.

In the lower half of the pixel PX, respective openings are formed between the first main electrode PA1 of the pixel electrode PE and the third main electrodes CA1 of the counter electrode CE, between the third main electrodes CA1 and the first main electrode PA2, between the first main electrode PA2 and the third main electrode CA2, and between the third main electrode CA2 and the first main electrode PA3 in the second unit configuration UA2. Further, respective openings are formed between the first main electrode PB1 of the pixel electrode PE and the third main electrodes CB1 of the counter electrode CE, between third main electrodes CB1 and the first main electrode PB2, between the first main electrode PB2 and the third main electrode CB2, and between the third main electrode CB2 and the first main electrode PB3 in the second unit configuration UA2. Since the distance between adjacent main electrodes which forms each opening in the second unit configuration UA2 differs from that of the first unit configuration UA1, the main alignment direction of the liquid crystal molecule LM in each opening turn into direction shown one of the arrows A5 to A8 in the figure where electric field is formed between the pixel electrode PE and the counter electrode CE. The directions shown by the arrows A5 to A8 differ from the directions shown by the arrows A1 to A8 in the figure. Accordingly, in this embodiment, the alignment of one pixel PX is divided into 8 alignment portions.

According to the above structure, more visual-angle directions can be compensated optically and it becomes possible to reduce more the visual-angle dependency at the time of performing a gradation display.

In addition, in the above-mentioned embodiment, although the case where the direction of the initial alignment of the liquid crystal molecule corresponds to the first direction X is explained, the direction of the initial alignment may be the second direction Y, or may be a direction different from the first direction X and the second direction Y, respectively. In respective cases, the first cross line direction in which the first main electrode and the third main electrode extend, and the second cross direction in which the second main electrode and the fourth main electrode extend are suitably set up with respect to the direction of the initial alignment.

Hereinafter, one practical example of the above-mentioned structure is described.

EXAMPLE

Firstly, an array substrate AR equipped with the pixel electrode PE as shown in FIG. 6 was prepared. Each width of the first main electrode PA and the second main electrode PB constituting the pixel electrode PE is set to 7 µm. In the array substrate AR, a first alignment film AL1 of 70 µm film thickness, which shows the lateral alignment characteristics, was formed covering the pixel electrode PE, and then the rubbing processing was performed along the first direction X.

On the other hand, a counter substrate CT equipped with a counter electrode CE was prepared as shown in FIG. 6. Each width of the third main electrode CA and the fourth main electrode CB constituting the counter electrode CE was set to 7 µm. A second alignment film AL2 of 70 µm film thickness, which shows the lateral alignment characteristics, was formed covering the counter electrode CE, and then the rubbing processing was performed along the first direction X. However, the rubbing direction RB of the first alignment film AL1 was set to a reverse direction to the second rubbing direction RB2 of the second rubbing film AL2. Moreover, the angle θ1 between the first direction X and the third direction D3 in which the first main electrode PA of the pixel electrode PE and the third main electrode CA of the counter electrode CE extend, and the angle θ2 between the first direction X and the fourth direction D4 in which the second main electrode PB of the pixel electrode PE and the fourth main electrode CB of the counter electrode CE extend, is set to 20°, respectively.

A 4.0 µm cell gap was formed between the array substrate AR and the counter substrate CT, and then the array substrate AR and the counter substrate CT were attached together. At this time, the distance between each main electrode of the pixel electrode PE and each main electrode of the counter electrode CE was set to 10 µm in the first unit configuration UA1 of the upper half of the pixel PX. Moreover, in the second unit configuration UA2 of the lower half of the pixel PX, the distance between each of main electrodes of the pixel electrode PE and each of main electrodes of the counter electrode CE was set to 13 µm, and the liquid crystal display panel LPN with a pixel pitch of 50 µm was produced by injecting positive type liquid crystal material made of Merck Co. in the gap between the array substrate AR and the counter substrate CT.

According to this example, in one pixel PX, much more domains were formed and the visual angle was able to be compensated in more directions. Moreover, according to this example, it was confirmed that the visual-angle dependency at the time of performing a gradation display can be reduced more. Furthermore, according to this example, when a black image is displayed in each pixel PX, it was confirmed near the gate line G that light slipping does not occur.

As explained above, according to this embodiment, the high quality liquid crystal display can be offered.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device constituted of a plurality of pixels, comprising:
   a first substrate including:
      gate lines,
      source lines,
      a pixel electrode for the pixel having a first main electrode in a stripe shape extending along a first cross line direction which crosses at an acute angle in a counterclockwise direction with respect to an initial alignment direction of liquid crystal molecules, and a second main electrode in a stripe shape extending along a second cross line direction which crosses at an acute angle in a clockwise direction with respect to the initial alignment direction of the liquid crystal molecules, and
      a first alignment film covering the pixel electrode;
   a second substrate including:
      a counter electrode having a third main electrode in the stripe shape arranged above a pair of regions sandwiching the first main electrode extending along a first cross line direction and a fourth main electrode in the stripe shape arranged above a pair of regions sandwiching the second main electrode extending along the second cross line direction, and
      a second alignment film; and
   a liquid crystal layer held between the first substrate and the second substrate; wherein
   each of the pixel includes a first unit configuration and a second unit configuration, and
   the first and second unit configurations are respectively formed by combining the first main electrode and the third main electrode extending along the first cross line direction, and combining the second main electrode and the fourth main electrode extending along the second cross line direction, wherein
   a distance between the first main electrode and the third main electrode in the first unit configuration is different from a distance between the first main electrode and the third main electrode in the second unit configuration, and
   a distance between the second main electrode and the fourth main electrode in the first unit configuration is different from a distance between the second main electrode and the fourth main electrode in the second unit configuration.

2. The liquid crystal display device according to claim 1, wherein the angle θ1 between the direction of the initial alignment and the direction of the first cross line, and the angle θ2 between the direction of the initial alignment and the direction of the second cross line are set to an angle smaller than 45° and larger than 0°, respectively.

3. The liquid crystal display device according to claim 2, wherein an angle made by extending directions of the pixel electrode and counter electrode, and the rubbing direction is in a range of 5° to 25.

4. The liquid crystal display device according to claim 3, wherein the angle between extending directions of the pixel electrode and counter electrode, and the rubbing direction is approximately 10°.

5. The liquid crystal display device according to claim 1, wherein the angle θ1 between the direction of the initial alignment and the direction of the first cross line is the same as the angle θ2 between the direction of the initial alignment and the direction of the second cross line.

6. The liquid crystal display device according to claim 1, wherein the area of a first opening portion formed between the first main electrode and the third main electrode is approximately the same as that of a second opening portion formed between the second main electrode and the fourth main electrode in one pixel in which the pixel electrode is arranged.

7. The liquid crystal display device according to claim 1, wherein the pixel electrode includes a first secondary electrode extending in parallel with the gate line and covering the gate line, and
   the counter electrode includes a second secondary electrode in the stripe shape arranged above the first secondary electrode and extending in parallel with the first secondary electrode.

8. The liquid crystal display device according to claim 1, wherein the gate line is arranged approximately in the center of the pixel.

9. The liquid crystal display device according to claim 1, wherein the first substrate further includes an auxiliary capacitance line and a capacitance portion arranged above the auxiliary capacitance line and electrically connected with the pixel electrode.

10. The liquid crystal display device according to claim 1, wherein respective rubbing directions of a first alignment film and a second alignment film are set in parallel with an initial alignment direction together.

11. The liquid crystal display device according to claim 1, wherein one pix is formed of a plurality of domains in which the alignment directions are different each other.

* * * * *